US009294419B2

(12) United States Patent
Hasenplaugh et al.

(10) Patent No.: US 9,294,419 B2
(45) Date of Patent: Mar. 22, 2016

(54) SCALABLE MULTI-LAYER 2D-MESH ROUTERS

(71) Applicant: Intel Corporation, Santa Clara, CA (US)

(72) Inventors: William C. Hasenplaugh, Boston, MA (US); Tryggve Fossum, Northborough, MA (US); Judson S. Leonard, Newton, MA (US)

(73) Assignee: INTEL CORPORATION, Santa Clara, CA (US)

( * ) Notice: Subject to any disclaimer, the term of this patent is extended or adjusted under 35 U.S.C. 154(b) by 89 days.

(21) Appl. No.: 13/927,523

(22) Filed: Jun. 26, 2013

(65) Prior Publication Data
US 2015/0003281 A1     Jan. 1, 2015

(51) Int. Cl.
*H04L 12/933* (2013.01)
*H04L 12/721* (2013.01)
*H04L 12/24* (2006.01)
*H04L 12/733* (2013.01)

(52) U.S. Cl.
CPC .............. *H04L 49/15* (2013.01); *H04L 41/12* (2013.01); *H04L 45/12* (2013.01); *H04L 45/122* (2013.01); *H04L 49/101* (2013.01)

(58) Field of Classification Search
CPC ..... H04L 49/15; H04L 45/122; H04L 49/101; H04L 49/109; G06F 15/17381; G06F 15/7825
See application file for complete search history.

(56) References Cited

U.S. PATENT DOCUMENTS

| | | | |
|---|---|---|---|
| 6,973,559 B1 * | 12/2005 | Deneroff et al. | 712/12 |
| 7,961,721 B2 * | 6/2011 | Denteneer et al. | 370/359 |
| 8,050,256 B1 * | 11/2011 | Bao et al. | 370/386 |
| 8,601,423 B1 * | 12/2013 | Philip et al. | 716/122 |
| 8,819,616 B2 * | 8/2014 | Philip et al. | 716/138 |
| 2009/0213863 A1 * | 8/2009 | Denteneer et al. | 370/412 |
| 2012/0099475 A1 * | 4/2012 | Tokuoka | 370/253 |
| 2014/0331027 A1 * | 11/2014 | Philip et al. | 712/29 |
| 2014/0376557 A1 * | 12/2014 | Park et al. | 370/400 |

FOREIGN PATENT DOCUMENTS

| | | |
|---|---|---|
| WO | 2006/012284 A2 | 2/2006 |
| WO | 2006/012284 A3 | 1/2007 |
| WO | 2013/119241 A1 | 8/2013 |

OTHER PUBLICATIONS

Extended European Search Report received for European Patent Application No. 14173169.5, mailed on Nov. 17, 2014, 10 pages.

(Continued)

*Primary Examiner* — Albert T Chou
(74) *Attorney, Agent, or Firm* — Law Offices of R. Alan Burnett, P.S.

(57) ABSTRACT

Architectures, apparatus and systems employing scalable multi-layer 2D-mesh routers. A 2D router mesh comprises bi-direction pairs of linked paths coupled between pairs of IO interfaces and configured in a plurality of rows and columns forming a 2D mesh. Router nodes are located at the intersections of the rows and columns, and are configured to forward data units between IO inputs and outputs coupled to the mesh at its edges through use of shortest path routes defined by agents at the IO interfaces. Multiple instances of the 2D meshes may be employed to support bandwidth scaling of the router architecture. One implementation of a multi-layer 2D mesh is built using a standard tile that is tessellated to form a 2D array of standard tiles, with each 2D mesh layer offset and overlaid relative to the other 2D mesh layers. IO interfaces are then coupled to the multi-layer 2D mesh via muxes/demuxes and/or crossbar interconnects.

30 Claims, 12 Drawing Sheets

(56) References Cited

OTHER PUBLICATIONS

Bolotin et al., "QNoC: QoS Architecture and Design Process for Network on Chip", Journal of Systems, Elsevier, XP004492175, 2004, pp. 105-128.

Kohler et al., "Fault-Tolerant Architecture and Deflection Routing for Degradable NoC Switches", XP031472788, 2009, pp. 22-31.

Mhamdi et al., "Buffered Crossbar Fabrics Based on Networks on Chip", 8th Annual Communication Networks and Services Research Conference, XP031692661, 2010, pp. 74-79.

* cited by examiner

| Source Addr. | Dest. Addr. | Turn 1 ID | 1st Direction | Turn 2 ID | 2nd Direction | Priority | Management |
|---|---|---|---|---|---|---|---|
| W1 | E4 | 11 | S or Right | 41 | E or Left | 0 | 0 |
| W1 | E4 | 12 | S or Right | 42 | E or Left | 0 | 0 |
| W1 | E4 | 13 | S or Right | 43 | E or Left | 0 | 0 |
| W1 | E4 | 14 | S or Right | 44 | E or Left | 0 | 0 |

| Source Address | Destination Address | Priority | Management |
|---|---|---|---|
| W1 | E4 | 0 | 0 |
| W1 | E4 | 0 | 0 |
| W1 | E4 | 0 | 0 |
| W1 | E4 | 0 | 0 |

SCALABLE MULTI-LAYER 2D-MESH ROUTERS

GOVERNMENT LICENSE RIGHTS

This invention was made with Government support under contract number H98230-11-3-0011 awarded by the Department of Defense. The Government has certain rights in this invention.

FIELD OF THE INVENTION

The field of invention relates generally to routing and, more specifically but not exclusively relates to a multi-layer two-dimensional (2D)-mesh router architecture.

BACKGROUND INFORMATION

Router chips have historically been challenged to handle progressively higher data rates and at higher radix (i.e., the number of inputs and outputs) for at least two reasons. First, chip frequencies for routers are fundamentally limited by resistive-capacitive (RC)/wire delay—after all, there is some minimum amount of time required to get signals from one side of a chip to the other. Increasing the data rate, under a fixed frequency, amounts to employing wider internal busses. However, this is a not a scalable solution since the quanta of data that is moved in a router chip is not large, or at least does not increase with increasing data rates. Second, it is preferable to have a router that is high-radix: it is preferable to have many narrow channels on a router rather than a few wide channels. Again, this is to accommodate narrow native messages and to reduce the total hop-count across the network of router nodes (the average number of hops across the network is inversely proportional to the log of the radix). In fact, the optimal radix for a router chip is roughly linear in both the bandwidth of a router and the log of the number of nodes in the system. For example, very large high-performance computer (HPC) systems with 1000's of sockets need very high bandwidth and high radix routers.

Current approaches to building high-radix, high bandwidth routers have largely focused on topology. A recent survey of router topologies has demonstrated a tendency to focus on the tradeoff between socket-wide topology and the implied complexity of the internal switch crossbars and wiring implications. For instance, consider the simple 2D mesh, where each node is the location of a chip Input-Output (IO) pair (i.e., the input and output of a particular channel), such as shown in FIG. 1. As illustrated, there are 64 nodes, which correspond to 64×64 channels. This configuration also supports 64 IO's (in the absence of having multiple IO's sharing the same node).

This topology has the advantage that each node communicates with at most four neighbors and its local IO—requiring, at worst, a 5×5 switch. In addition, the wiring is very regular. However, the concentration of traffic is very uneven, drastically overburdening the central part of the chip, while the perimeter is comparatively underutilized. This asymmetry of bandwidth usage compromises the 2D-mesh's ability to deliver sufficient bandwidth in many situations.

To better understand how this asymmetry occurs, consider the following. Under most architectures, chip IO's (i.e., inputs and outputs to and from the router chip) come into the chip from the perimeter. At the same time, each node in the 2D mesh operates as a switch, receiving data at an input and forwarding it as an output to an adjacent node. As a result, for IO's that are associated with nodes that are not on the periphery, data is first transferred to the IO's associated node via wiring between the IO and the node. A routing determination is then made at the node, and the data is forwarded from that node to the node associated with the destination IO. Once forwarded to that node, the data is then transferred from the node via wiring to the destination IO. Under this scheme, the nodes toward the center are involved in forwarding more data than the nodes toward the edges, with the nodes along the periphery handling the least amount of traffic.

This 2D-mesh topology has other drawbacks. As mentioned, wiring is implemented between each IO and its associated node (in addition to the wiring between nodes). This is expensive in terms of routing area and energy, and does not scale well. This approach is also inefficient. More precisely, for any topology that brings edge IO's to topological entry points (for routing decisions) distributed over the whole area of the chip, forwards the data to a centrally located exit point and finally sends it to an edge IO, the total expected distance travelled is 1.66 times the edge length of the chip (for a square chip and uniformly random distribution of inputs to outputs). This is nearly double the expected Manhattan distance (i.e., the shortest path between two nodes in a 2D grid) between edge IO input/output pairs. The expected distance for the case where the entry points are located on the perimeter depends on the source edge and the destination edge. For instance, if the source and destination edge are perpendicular to one another, the expected distance is 1, whereas if the source and destination edge are the same, it is 0.33. Finally, if the source and destination edges are opposite one another, the expected distance is 1.33—leading to an average distance of 11/12 (=0.917), which is the Manhattan distance and is thus optimal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
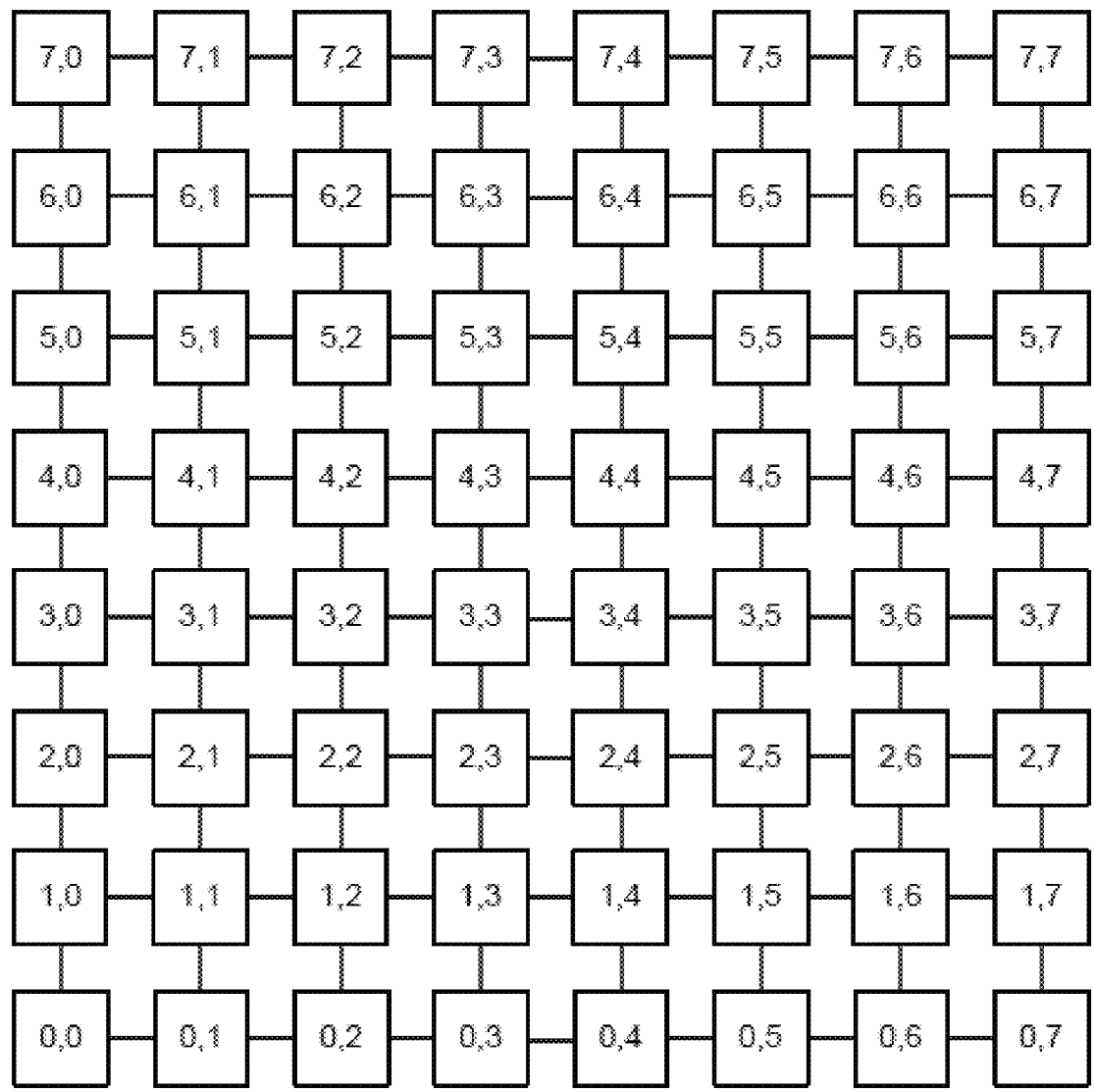
FIG. 1 is a schematic diagram of a conventional 2D router configuration under which IOs are coupled to each node.

Embodiments of architectures, apparatus and systems for implementing scalable multi-layer 2D-mesh routers are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used here, the terms 10 and IO interface may, at times, be used interchangeably, as is common in the art. For example, a router chip or router mesh implemented on an System on a Chip (SoC) or the like does not typically include any IO devices, but is configured with a plurality of IO interfaces to enable IO devices and other components, such as Intellectual Property (IP) blocks such as processor cores, memory controllers, and interconnects such as interconnect fabrics and buses with applicable IO interfaces to connect to the IO interfaces on the router chips and router meshes.

In accordance with aspects of the embodiments of scalable multi-layer 2D-mesh routers of discussed herein, enhancement in both router path utilization, traffic distribution and power efficiency are provided. For example, under the conventional approach where data is sent from perimeter IO's to the central part of the router prior to even evaluating the data's destination is wasteful, since this costs (on average) an extra 0.75 edge lengths of distance (1.666–0.916=0.75), as discussed above. In contrast to the conventional 2D mesh approach, the embodiments employ an optimized design under which the transfer of data between any source IO and any destination IO only traverses the Manhattan distance between the IOs.

In accordance with some embodiments, the techniques disclosed herein may be implemented in router having a square or rectangular 2D mesh configuration. For example, consider a router which has n input/output pairs on each edge of a square router chip. Thus, the chip would be regarded as a general 4n×4n router. Next, the design makes use of a mesh (for a square 2D mesh) with n rows and n columns, where each row and column comprises a pair of links delivering equal bandwidth in both directions. Under other embodiments, a rectangular n×m mesh with n rows and m columns is employed.

Figure 2:
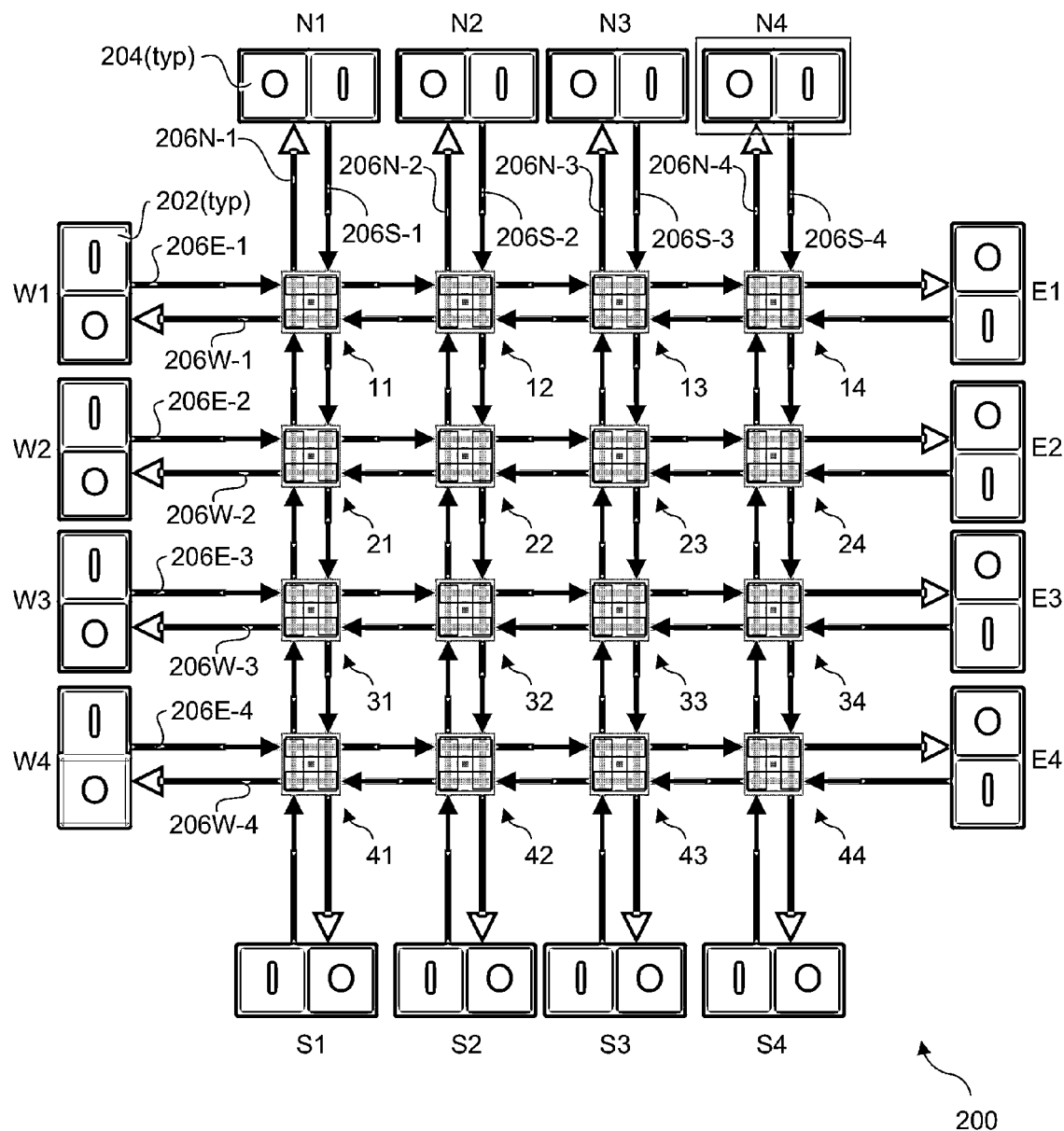
FIG. 2 is a schematic diagram of a 2D router mesh under which all IO interfaces are at the periphery of the mesh and including data paths configured in bi-direction rows and columns, in accordance with an embodiment of the invention.

By way of example, a 16×16 router 200 having 4 rows and 4 columns is shown in FIG. 2. Router 200 supports forwarding/routing of data between IO inputs 202 and IO outputs 204 of IO interfaces 201 (as depicted in the drawings, "typ" means typical). In further detail, each pair of the IO inputs 202 and outputs 204 corresponds to an IO interface 201 that is identified by a row or column (as applicable) and a direction: (N)—North, (E)—East, (S)—South, and (W)—West For example, IOs N1, N2, N3, and N4 indicate that corresponding IO interfaces are located along the North side of router 200 in respective columns 1, 2, 3, and 4. Similarly, IOs W1, W2, W3, and W4 are located along the West side of router 200 in respective rows 1, 2, 3, and 4.

Each IO input 202 is connected to an IO output 204 via a path 206 labeled to include a direction and a column (for North and South paths) or row (For East and West paths). For example, the South path in column 1 is labeled 206S-1, while the West path in row 1 is labeled 206W-1. The paths are logically grouped as bi-directional pairs, and there is steering and flow control logic and circuitry present at each node collocated at each "intersection" of crossing bi-direction pairs. The node at each intersection is identified by the row and column of its associated bi-direction pairs, e.g., node 11 corresponds to the intersection of East and West paths 206E-1 and 206W-1 in row 1 with North and South paths 206N-1 and 206S-1 in column 1.

As explained in further detail below with reference to FIG. 3, the steering and flow control logic and circuitry is used to steer data along the path segments (i.e., links) leading to the shortest route between a source input and a destination output (i.e., the Manhattan distance). In one embodiment, during each unit interval (UI), a unit of data (data unit) is transferred between nodes along each path segment. Generally, each UI will comprise multiple clock cycles, noting (as discussed below) that under some embodiments multiple clock domains may be implemented. At each intersection, logic is implemented to inspect the data unit (e.g., inspect a header or similar information) to determine which direction the data unit is to be forwarded to the next node along its shortest path route. In one embodiment, data units that are forwarded along the same path direction they are received have priority over data units that are to be "turned" at a node. Consider that under a shortest path routing scheme, for any given input-to-output route, there will be two turns at most (for source inputs and destination output on the same side, and for most instances in which source inputs and destination outputs are on opposing side), with approximately 50% of the paths (when considering an even distribution of traffic) including only a single turn, and a small percentage of paths being straight through with no turns.

As an analogy to the data unit forwarding technique implemented by router 200, consider that each East-West pair of paths correspond to a first pair of train rails at one level, while each North-South pair of paths correspond to a second pair of train rails at a different level that are perpendicular to the East-West rails. For point of illustration, suppose the East-West rails are at grade level and the North-South paths correspond to subway lines. Additionally, there is a train station at each node at which passenger may get on, get off, or transfer between trains.

If a passenger desires to continue in a given direction, the passenger merely stays on the train at each station. Conversely, in order to change directions, a passenger has to get off the train at a station, change floors, and wait for the next train to arrive. Additionally, passengers may not get on any trains that are full. In further context to the train analogy, each train only can hold a single passenger, and for each station there is a train arriving from each of the rail paths corresponding to the East, South, West and North directions for each unit interval.

Figure 3:
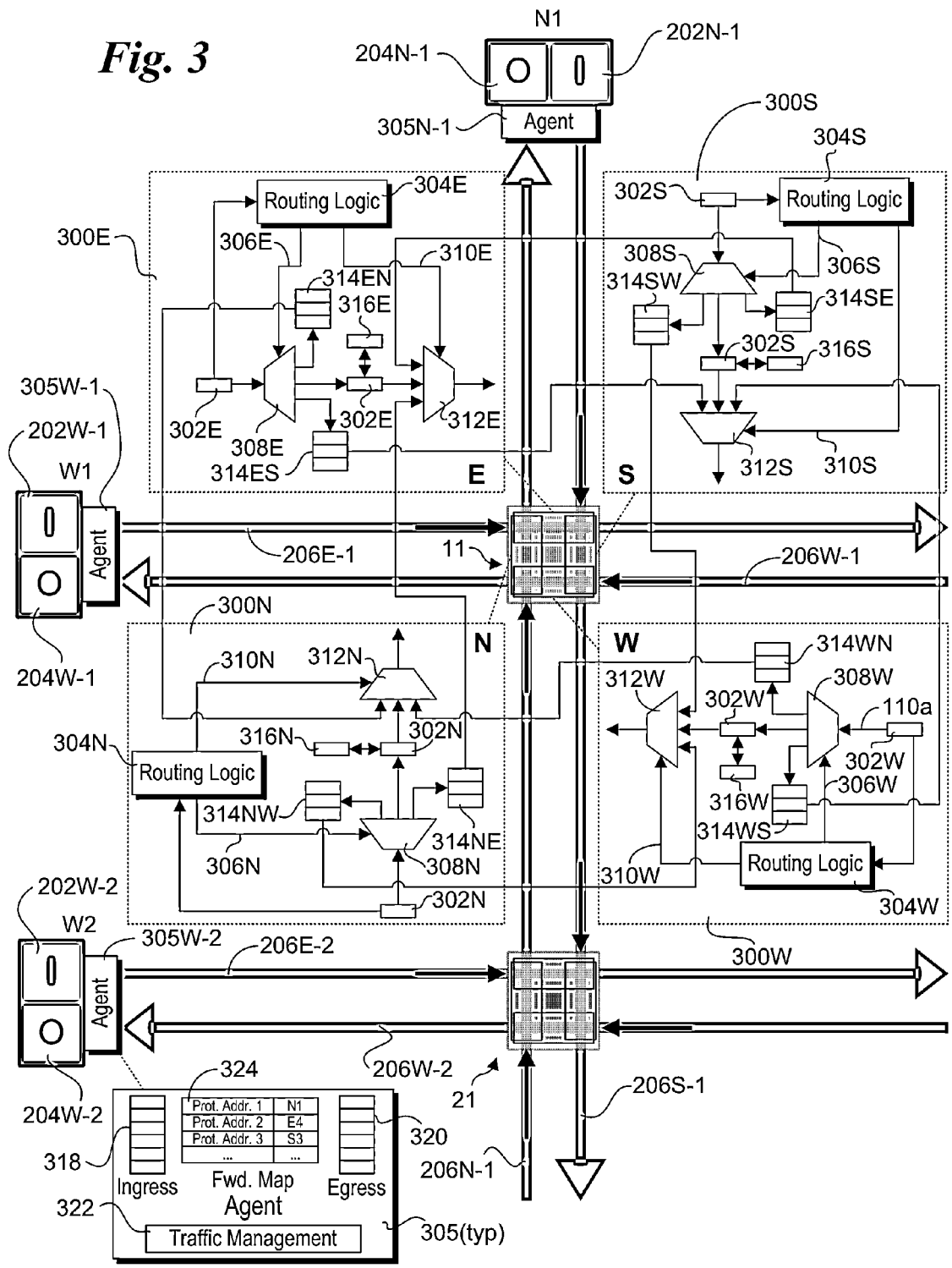
FIG. 3 is a schematic diagram illustrating circuitry and logic configured to facilitated forwarding of data units at a router node; according to an embodiment.

FIG. 3 illustrates circuitry and logic for implementing the steering and flow control operations performed at each node according to one embodiment. As shown, a similar set of components and logic 300E, 300S, 300W, and 300N is respectively implemented for each of the North, East, South and West paths at each node, as depicted for node 11, which is located at the intersection of East and West paths 206E-1 and 206W-1 with North and South paths 206S-1 and 206N-1. Additionally, in FIG. 3 the similar components share the same base reference number with a suffix indicating what direction the component is associated with. For simplicity and convenience, the set of components corresponding to the East path will be discussed in detail; it will be understood that a similar set of components is implemented for each of the North, South, and East paths intersecting at each node, as labeled in FIG. 3. In addition, the E, S, W, and N suffixes may not be mentioned at times in the following discussion.

As each data unit arrives at a node it is buffered in a node input buffer 302, whereupon it is inspected by routing logic 304. Generally, a data unit will correspond to a unit of data that is particular to an associated protocol used to transfer data between IO devices either connected directly to the router or using the router as part of an overall forwarding path associated with the transfer of data. By way of example and without limitation the protocol might comprise a Peripheral Component Interconnect Express (PCIe™) protocol, an Open Core Protocol™ (OCP), an Intel® QuickPath Interconnect (QPI™) or Keizer Technology Interconnect (KTI) protocol, an Intel® On-chip Scalable Fabric (IOSF) protocol, or an Advanced Microcontroller Bus Architecture (AMBA)-related protocol. A data unit will generally comprise a type of data unit associated with the protocol, such as a packet for PCIe™ and OCP or a "Flit" for QPI™ or KTI.

In one embodiment, an agent 305 or the like is located at each IO interface and is configured to add a router "wrapper" to the data unit corresponding to the applicable protocol, as depicted by agents 305N-1, 305W-1 and 305W-2. In one embodiment, the router wrapper comprises a data unit header that includes an identifier for the source input and destination output IO addresses, which may comprise a number, an alphanumeric value, or a coded address or the like. For example, in one embodiment the source input and destination output addresses correspond to the identities of the corresponding IOs using the direction-row and direction-column coding schemes illustrated in FIGS. 2 and 3.

Routing logic 304 for each path is configured to determine along which path to forward a data unit out from a node, and to manage traffic flow through the node. In an embodiment in which a direction-row number and direction-column number coding scheme is used, the path selection aspect of the logic can be very simple. For example, in one embodiment the destination output address includes the direction of the side the output IO is on and its row (if East or West) or column (if North or South). The routing logic for each path is configured with the row and column (number) for the node, along with the direction for the path. If the direction in the destination address is the same as the path direction, then the routing logic is configured to forward the data unit along the current path. If the destination address direction is different from the path direction, in one embodiment the routing logic is configured to compare the row or column (as applicable) with the row and column associated with its node. If there is a match, the data unit needs to be "turned" in the proper direction. If there is not a match, the data unit is forward along the same path via which it arrived at the node. It is further noted that U-turns are not permitted, since if the source input and destination output belonged to the same IO, there would be no need to employ any of the paths depicted for router 200.

Routing logic 304 is configured to provide a control input 306 to a 1:3 demultiplexer (demux) 308, and a control input 310 to a 3:1 multiplexer (mux) 312. As illustrated in FIG. 3, for data units that are to be forwarded along the same path, the data unit remains in node input buffer 302. (It is noted that two instances of node input buffers 302 are shown to illustrate the logical output of the demuxes 308 in connection with illustrating the process flows for the data units.) If the data unit is to be turned, it is logically output from demux 308 into an applicable turn buffer 314. Although turn buffers 314 are located in FIG. 3 within a quadrant associated with a given path direction, they are labeled to indicate the path direction they came from and the path direction they are to be turned to. For example, the two turn buffers associated with the East path direction that are coupled to the output of demux 308E are labeled 314ES and 314EN. In one embodiment, turn buffers 314 comprise First-in, First-out (FIFO) buffers, as depicted herein by buffers including three slots. In practice, the number of slots in the FIFO buffer may vary depending on the particular implementation parameters and the like. In addition, other types of buffers with one or more slots may be employed.

In one embodiment, the logic for controlling the output of muxes 312 is configured to prioritize data units being forwarded along the same path direction as they are received as inputs (i.e., straight-through paths are prioritized over turned paths). As depicted, the three inputs to muxes 312 include the node input buffer 302 for the path, along with a pair of left and right FIFO turn buffers 314 containing data units that are to be turned to the path direction identified by the buffer 314 suffixes. Under one embodiment of the priority scheme, if, for a given UI, the data unit forwarded to the node contains data, that data unit is selected as the output of mux 312 and forwarded to the next node along the current path (or output destination if the last node along a forwarding path). If the data unit is a null data unit (i.e., containing no data, as described below), then data from one of the FIFO turn buffers 314 may be selected to fill the null data unit slot.

In one embodiment the straight through path prioritization scheme is employed unless one of the FIFO turn buffers either becomes full or exceeds a predefined threshold. This is to prevent blockage of data units at the router nodes. In response to detection of a turn buffer fill or threshold event, routing logic 304 for the path provides a control input 310 to cause mux 312 to output a data unit buffered in that the turn buffer associated with the event. In order to clear node input buffer 302 for the next UI, the data unit in the node input buffer (if not null) is moved or copied to a pause buffer 316. In one embodiment, pause buffer 316 includes a single slot, as shown. Optionally, pause buffer 316 may comprise a FIFO buffer or other type of buffer with multiple slots.

In addition to use of a pause buffer and FIFO turn buffers, in one embodiment each of agents 305 includes one or more ingress buffers 318 and egress buffers 320, as shown toward the bottom of FIG. 3. Optionally, the ingress and egress buffers may be provided by the input and output of an IO interface itself, with an agent managing access to those buffers. Additionally, in one embodiment agents 305 are configured to occasionally or selectively transmit null data units. A null data unit represents an empty UI slot (or by analogy, an available seat on the train), enabling backed up traffic at one or more nodes sharing the same row or column of the agent transmitting the null data units to be cleared out. In one embodiment the nodes and agents 305 include logic that enables a node that is being overwhelmed with traffic (i.e., a hot spot) to request one or more agents to apply backpressure on one or more flows in connection with transmitting null data units to enable the node to clear some of its buffered data units. This logic is collectively depicted as a traffic management block 322 for agent 305.

In addition, each agent 305 includes a forwarding address map 324 which is employed to map between protocol destination addresses and router IO addresses and/or IO addresses corresponding to IO outputs via which a downstream transaction target IO device may be accessed. In instances in which multiple protocols are supported, embodiments may employ a separate forwarding address map for each protocol, or the protocols may be combined. As with conventional forwarding and routing tables, entries in a forwarding address map may comprise other values in addition to protocol addresses, such as hash results and/or address ranges, and other parameters.

Figure 4:
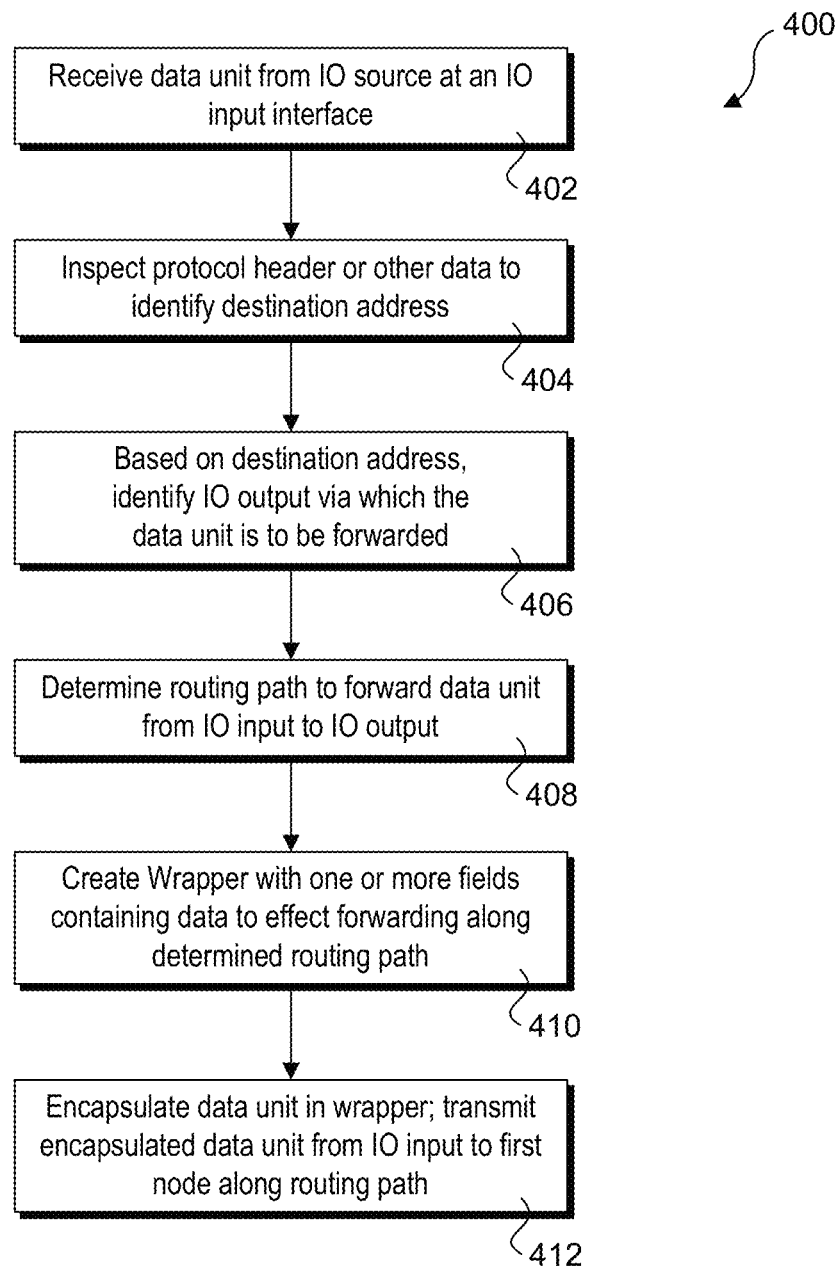
FIG. 4 is a flowchart illustrating operations perform by an agent in connection with forwarding a data unit, according to an embodiment.

Generally, agent 305 or other logic associated with an IO interface is configured to effect forwarding of data units received from external (to router 200) IO devices and IP blocks and the like that are destined for other IO devices/IP blocks that are also coupled to and external to router 200. For example, flowchart 400 of FIG. 4 illustrates an exemplary set of operations that may be implemented by agent 305 in connection with forwarding such data units.

The flowchart operations begin in a block 402, in which a data unit is received from an IO source at an IO input interface. Upon being received, the data unit typically will be buffered (e.g., in an ingress buffer) and the protocol header or other data will be inspected to identify the destination address of the destination IO that is coupled to router 200 (not shown), as depicted in a block 404. Based on this destination address, a suitable IO output interface of router 200 via which the data unit is to be forwarded to the destination IO is identified in a block 406.

Once the IO output of router 200 is identified, a routing path to forward the data unit from the IO input to that IO output is identified in a block 408. As discussed above, the use of routing paths that result in the shortest route path (i.e., the Manhattan distance) are preferred. In some embodiments, shortest route paths are selected during ongoing operations, with the ability to use alternative paths (either as an alternative shortest path or a longer path) in view of dynamic considerations, such as real-time traffic. In other embodiments, routing paths between IO inputs and outputs are preconfigured in advance. In general, the routing paths that observe the Manhattan distance criteria may comprise, zero, one, or two turns (as applicable), as discussed above.

Once the routing path is determined, a wrapper is created in a block 410 comprising one or more fields containing data to effect forwarding along the routing path. The data unit is then encapsulated in the wrapper, and the encapsulated data unit is transmitted from the IO input to the first node along the routing path, as depicted by a block 412.

In accordance with another aspect, in some embodiments all of a portion of the interior nodes are configured to implement a repeater-type function, wherein the transmitter signal voltage levels for transmitter path segments connected to those nodes are boosted. This helps facilitate routing along relatively long paths while maintaining signal errors within design tolerances for the applicable transport protocols employed by the router. For example, although the routing paths depicted herein are relatively short for illustrative purpose, a router chip with 100's of IOs could support route paths with 100 or more path segments.

Handling 0, 1, and 2 Turns and Traffic Distribution Considerations

Router 200 is configured to enable transfer of data units between any source input destination output pairs. As discussed above, the routing paths may thus comprise zero, one, or two turns. Accordingly, it is desired to provide a wrapper encoding to support each of these options. In one embodiment, the router wrapper employs the fields shown in FIG. 5*a*, which include a source address 500, a destination address 502, a turn 1 node ID 504, and a turn 2 node ID 506. The router wrapper may also include a priority field 508, and/or a management field 510, which are depicted by boxes with dashed lines to indicate these fields are optional. The priority field is used for prioritizing data units for implementations that support prioritization. In one embodiment, the management field is a single bit indicating whether or not the wrapper contains a management message. In this case, corresponding management information may be provided via one or more additional wrapper fields (not shown), or may be provided in the data payload for the data unit.

Figures 2A, 5A:
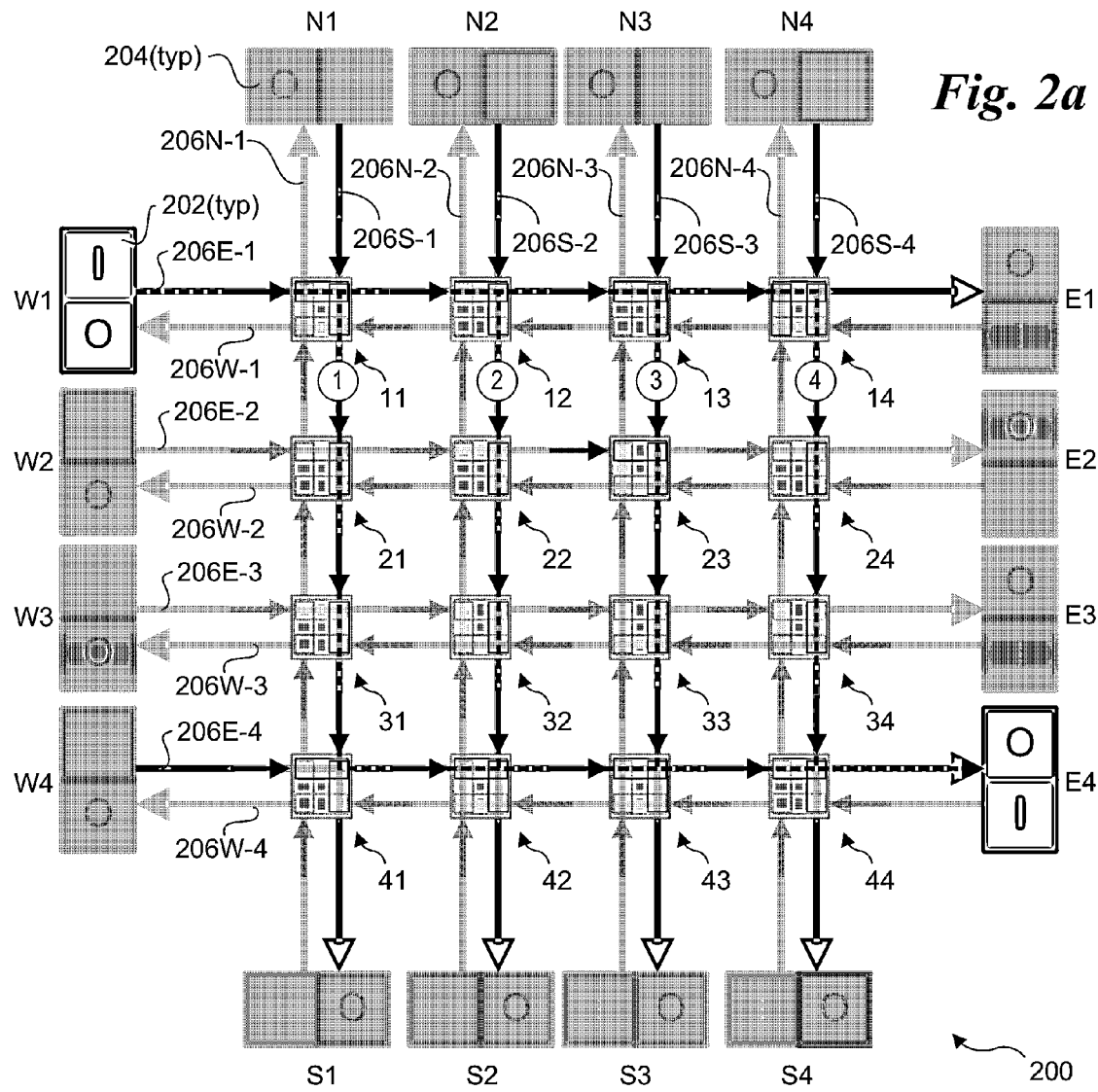
FIG. 2a show four least distance routing paths between an input IO and an output IO coupled to the 2D router mesh of FIG. 2.
FIGS. 5a, 5b, and 5c show exemplary sets of fields used in a wrapper to facilitate a routing path defined at an input agent, according to an embodiment.

FIG. 2*a* shows four routing paths 1, 2, 3, and 4 (depicted with encircled numbers) from a source input at IO W1 and a destination output at IO E4. Corresponding routing information is depicted in FIG. 5*a*. As will become apparent below, paths 1 and 4 are not preferred paths because these paths employ more edge nodes (i.e., nodes along one of the router's sides) than paths 2 and 3. It also should be observed that since actual routers in accordance with the teachings herein will generally employ a greater number of nodes than router 200, the majority of traffic transmitted between IOs on opposing sides of the router mesh will not traverse any edge nodes except for the edge nodes adjacent to the source input and destination output IOs.

Figure 6:
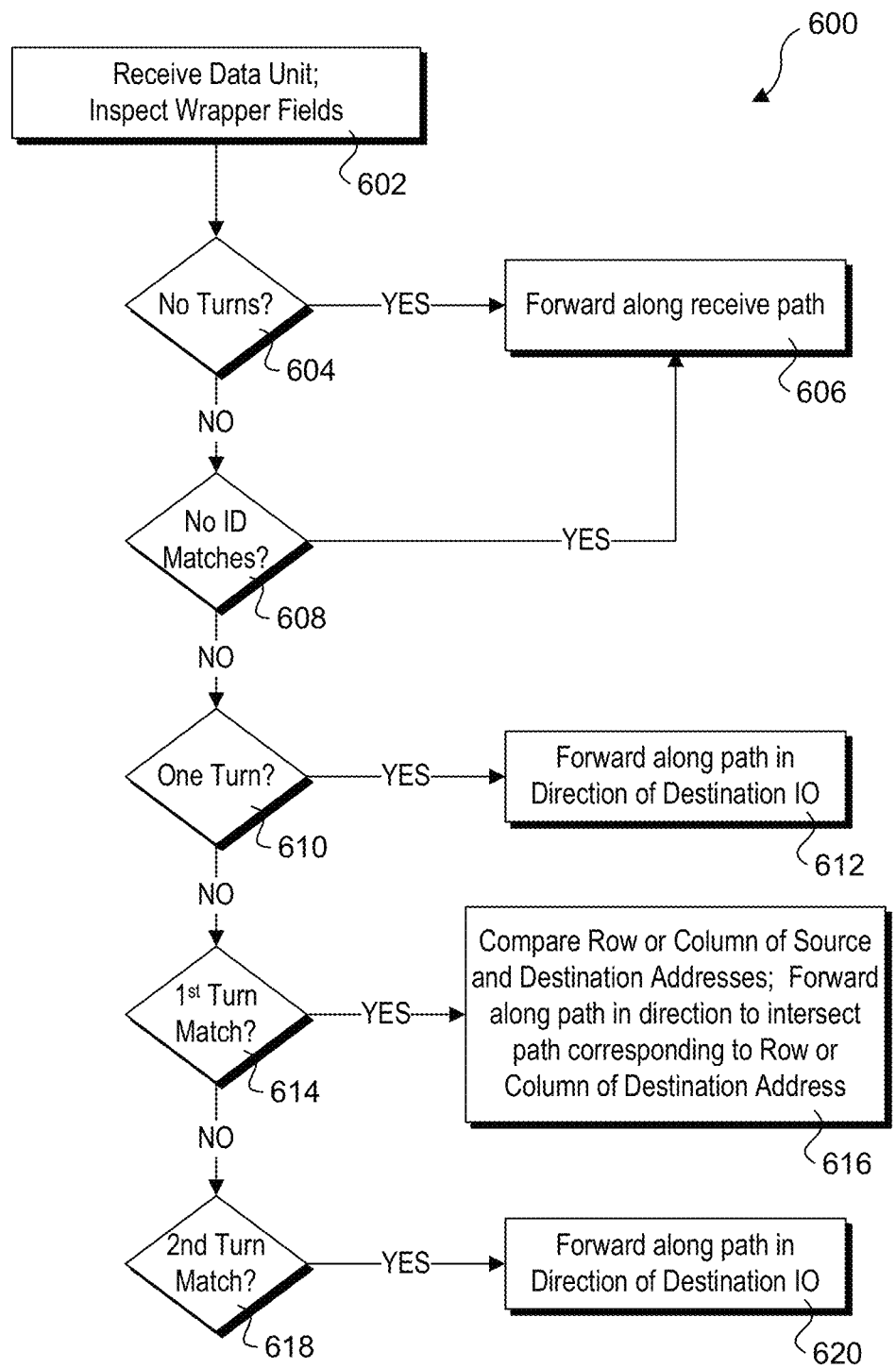
FIG. 6 is a flowchart illustrating operations and logic implemented by a node to effect forwarding of a data unit using the wrapper fields in FIG. 5a, according to an embodiment.

The wrapper fields of FIG. 5*a* are configured to support routing along paths supporting zero, one, or two turns. As shown in a flowchart 600 of FIG. 6, corresponding operations and logic are implemented at the router nodes (e.g., as part of router logic 314) to implement routing/forwarding data units through use of the illustrated wrapper fields in FIG. 5*a* as follows. First, in a block 602, in response to receiving a data unit at a node, its wrapper fields are inspected. In a decision block 604, a determination is made to whether the routing path has no (zero) turns. For a path with zero turns, the value in both turn 1 node ID field 504 and turn 2 Node ID field 506 may be set to 0 (also referred to as 'null') or to a predetermined value that does not match any node IDs in the router mesh. As shown in a block 606, if there are no turns in the path (as indicated by corresponding wrapper field values), the data unit is forwarded along the same path (direction) it was received.

For a path with one or two turns, the answer to decision block 604 will be NO, and the logic proceeds to a decision block 608 in which a determination is made to whether there is a node ID match for either of the node ID values in turn 1 node ID field 504 or turn 2 Node ID field 506. If there is not a match for either value, the evaluating node is not involved in turning the data unit and thus the data unit is forwarded along the same path it is received, as shown in block 606.

If the result of decision block 608 is NO, there is a match for the node ID in one of turn 1 node ID field 504 or turn 2 Node ID field 506, resulting in the logic proceeding to a decision block 610 in which a determination is made to whether the path has only one turn. If there is a match for the turn 1 node ID, in one embodiment the logic detects whether a null or predetermined value exists in turn 2 Node ID field 506, indicating the routing path only employs a single turn that is to be implemented at the node with an ID match. If this result is YES, the data unit will be turned to a path in the direction of the destination output IO, as shown in a block 612. In one embodiment the logic will look to the direction indicated by the destination address field 502 value and turn the data unit such that it will be forwarded along the path in that direction. As discussed above, this is implemented by copying the data unit to an applicable FIFO turn buffer 314.

If the answer to decision block 610 is NO, the routing path includes two turns. For a two-turn path, turn 1 node ID field 504 will contain the ID of the node that is to perform the first turn, and turn 2 Node ID field 506 will contain the ID of the node to perform the second turn. In a decision block 612 a determination is made to whether there is a node ID match for turn 1 node ID field 504. If the answer is YES, the logic proceeds to a block 616. For the first turn node of a two-turn path, the logic is a bit more complicated than the single turn case because the IO identified by the destination address will not have the same direction as the path the data unit is to be turned to. Rather, a comparison between the source and destination address row or columns (as applicable) is made to determine whether the row or column of the destination address is lower or higher than the row or column of the source address. Based on this outcome, the first turn node can determine which turn path to use. For example, for each of the routing paths 1, 2, 3, and 4 shown in FIG. 2a, the row of the destination address (4) is greater than the row of the source address (1). Since the source address corresponds to an IO on the West side of router 200, the routing logic at each of nodes 11, 12, 13, and 14 will determine that the first turn should result in the data unit being forward along a South path, as illustrated.

If the node ID match corresponds to the second turn node ID, as depicted by a decision block 618, the logic proceeds to a block 620 in which the data unit is turned to be forwarded along direction toward the destination output IO. As before, the direction of the destination address will be used to identify the direction of the path towards which the data unit is to be turned.

Under another approach, explicit turning direction information may be included in the wrapper field data. For example, FIG. 4b shows a modification to the wrapper fields of FIG. 4a, which now further include a first turn direction field 405 and a second turn direction field 407. As depicted, the direction information may comprise a fixed direction (North, East, South, or West), or a turn direction relative to the current path (e.g., Right or Left). Optionally, these directions could be encoded with a one-bit (for L or R) or two-bit value (for N, E, S, or W). This approach simplifies the logic employed for making routing decision at the nodes. The turn values may be encoded in a routing/forwarding table or the like at or otherwise accessible to agents 305. Optionally, the turn values may be dynamically calculated using logic at agents 305.

Figures 5B, 5C, 7A:
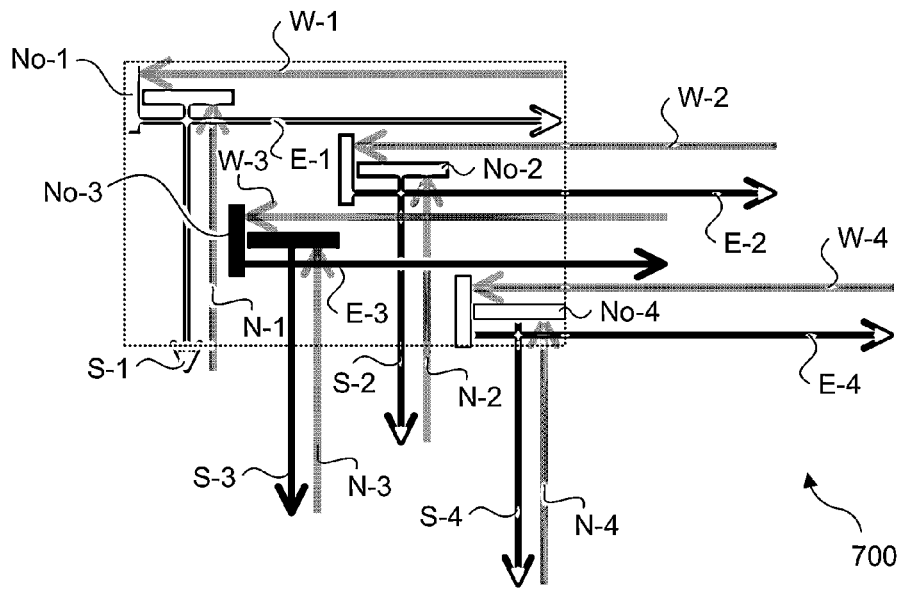
FIG. 7a is a diagram of a standard tile configure to be tessellated in an XY grid to implement four 2D router meshes overlaid and offset from one another.

Under another approach, each node includes a forwarding map based on the router source and destination addresses. Corresponding wrapper fields are shown in FIG. 5c, with the priority field 508 and management field 510 again being optional. Under one embodiment of this approach, data units are forwarded along the path they are received by default. As such, for a given node, the source and destination addresses for any route path that does not involve a turn at that node does not need to be included in the node's map. For route paths that involve a turn at the node, the map will include a source-destination address pair entry, which may be encoded using two separate fields or a single field, or through some other type of scheme, such as hashing, etc. Generally, the forwarding maps for the nodes may be defined in advance (e.g., preconfigured) using either hard-coding or loaded during initialization, with the option of updating forwarding maps in view of real-time traffic considerations.

As illustrated in FIG. 2a and discussed above, there are multiple paths having the same aggregate length for forwarding data units between source inputs and destination output located on opposite sides of the router. In one embodiment, the routing paths are selected so as to balance use of the paths in the central portion of the n×n mesh. Thus, for a given source input-destination output IO pair on opposing sides of the router, a single path that is determined in advance is implemented. Under an augmented approach, a single path for each source input-destination output IO pair on opposing sides of the router is determined in advance and initially used; however, during ongoing operations, selected paths may be reconfigured in view of actual path usage, which may be determined using real-time traffic measurements, averaged traffic measurements, or other traffic measurement schemes.

The design employed by router 200 suffers from traffic density imbalance assuming uniform traffic between all IO inputs and outputs. In particular, when the traffic is uniform, approximately 25% of the traffic will be routed from a source input to a destination output along the same edge. Under the minimum routing path criteria, this means the paths parallel to the router edges will become oversubscribed when compared to paths within the central portion of the n×n mesh (the central portion includes any node that is not direction coupled to an IO interface; these nodes are referred to as edge nodes, or otherwise nodes proximate to the periphery of the router chip). This results in a concentration of traffic around the periphery of the chip (or router mesh) that hamstrings the performance of the entire router.

In one embodiment, the foregoing issue is addressed by allocating additional paths along the edges while leaving the paths central to the n×n mesh for delivering traffic between different edges the same. Assuming uniform traffic, each edge needs an additional n/12 edge paths in order to match the traffic density on the edge paths with the traffic density in the central mesh. Accordingly, in one embodiment approximately n/12 additional edge paths are added. In addition to n×n meshes, embodiments may employ a rectangular n×m mesh; under one embodiment, approximately n/12 additional edge paths are added to the n×m.

If it is assumed a single router frequency is to be implemented in view of RC-dominated paths, there is a unique optimal frequency that these path segments would ideally run at, in order to deliver data at the minimum energy per bit. Unfortunately, this frequency may be insufficient to deliver the data coming in from the IO's on the perimeter of the chip at the same rate that data are received. However, under some embodiments this shortcoming is addressed by replicating the 2D-mesh with additional paths and nodes to increase the bandwidth supported by the router design.

Figure 7B:
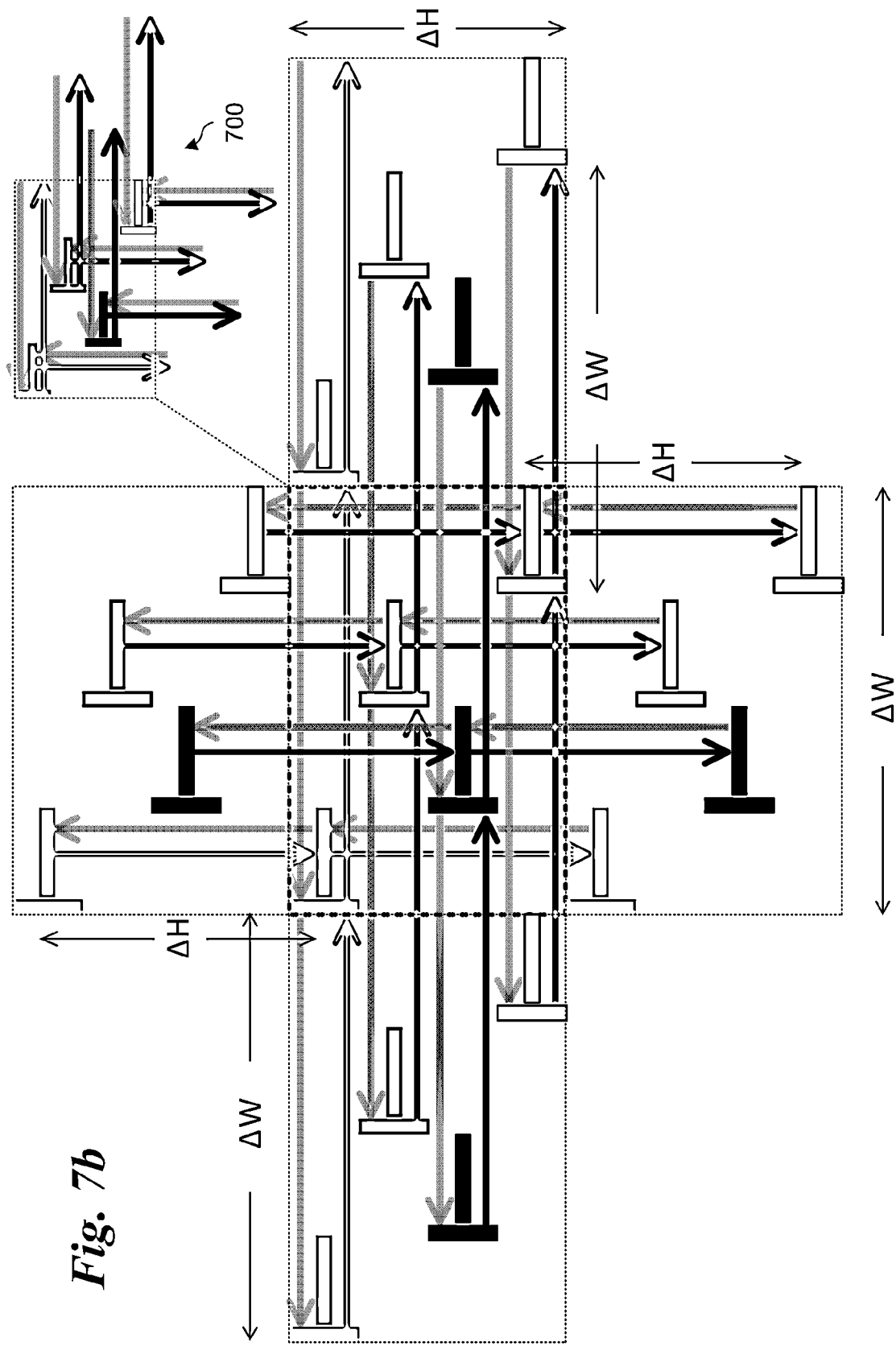
FIG. 7*b* is a diagram illustrating the tessellated layout spacing used for the standard tile of FIG. 7*a*.
Figure 8:
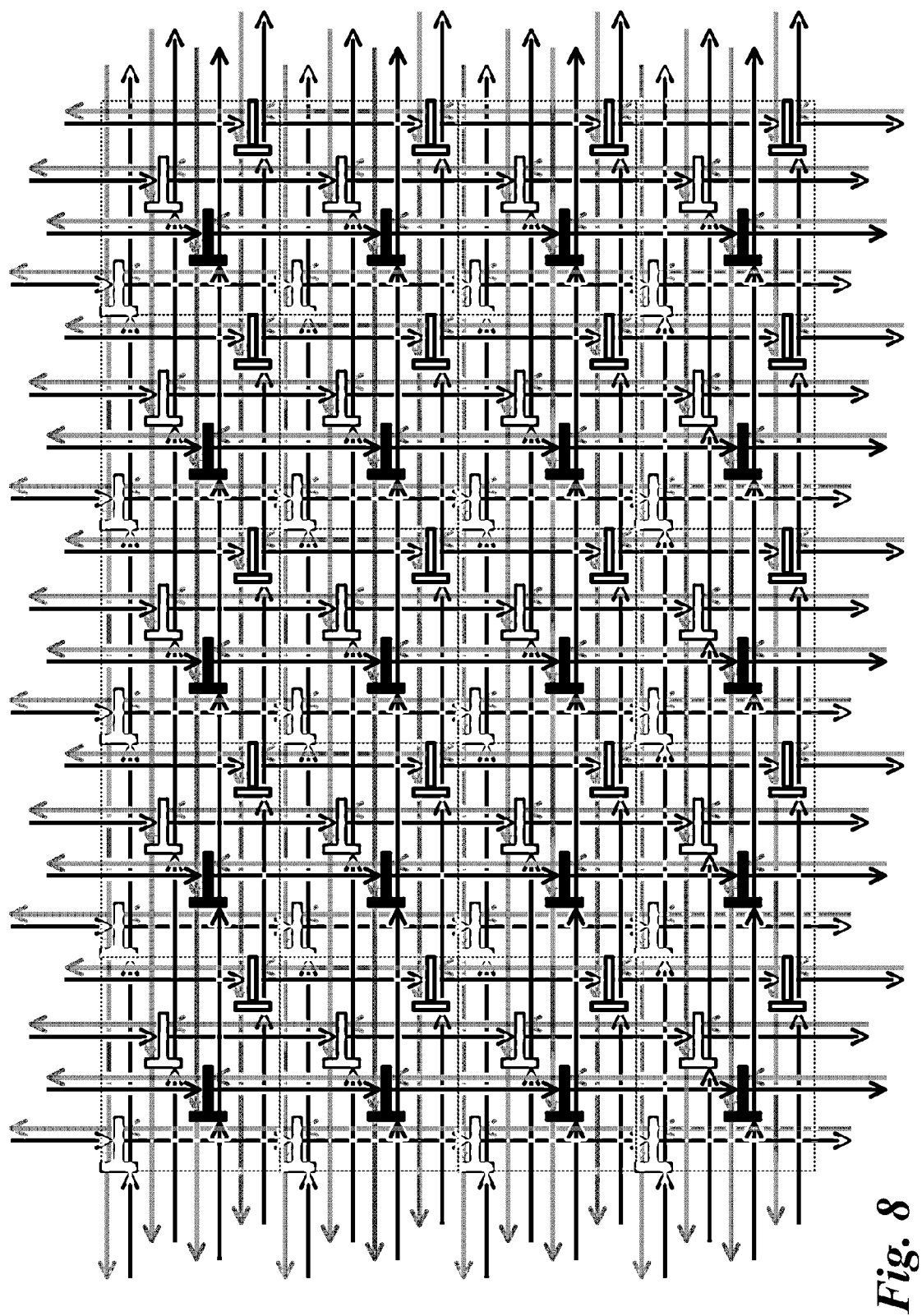
FIG. 8 is a diagram illustrating an interior portion of a four 2D router meshes build by tessellating the standard tile of FIG. 7*a* using the layout spacing of FIG. 7*b*.

Under one approach, the central n×n mesh is replicated multiple times, until the aggregate bandwidth is sufficient to deliver the data rate supported by the IOs coupled to the router. By way of example and without limitation, an implementation under which an n×n mesh is replicated four times is depicted in FIGS. 7a and 7b. Each of these meshes is identical, just translated in the x and y dimensions by a small amount and disposed on its own layer, such that the meshes are implemented on multiple overlaid layers. At the same time, the components in the interior of the router for a given mesh operate independent from the components for the other meshes. Under the illustrated embodiments of FIGS. 7a, 7b, and 8, a standard tile 700 (as shown in FIG. 7a) is tessellated across the die in an n×n grid, with a width of ΔW between tiles in the x direction and a height of ΔH in the y direction. In FIG. 7a and subsequent figures herein, each sideways 'T' represents a node, along with the circuitry and logic for implementing node forwarding and other operations performed by the various embodiments of the nodes as described herein. FIG. 8 illustrates addition tessellations of standard tile 700 to effect four n×n meshes implemented in a central portion of a router (noting only a portion of the n×n mesh is depicted). As stated above, each mesh operates independent from the other meshes and occupies is own layer such that the data paths between layers do not interconnect in the interior of the mesh.

As shown in FIG. 7a, standard tile 700 includes a set of data path segments and a node for each of four layers 1, 2, 3, and 4, which are represented using different grayscale levels. Each node is labeled No-L, where L is the layer, and each data path segment is labeled by its direction D and layer L, e.g., S-1 indicates a data path segment in the South direction on layer 1. (It is further noted that each 2D mesh itself comprises multiple layers (e.g., North and South paths are on a different layer than East and West paths); however the user of layers here is to distinguish the different 2D meshes.)

Figure 9:
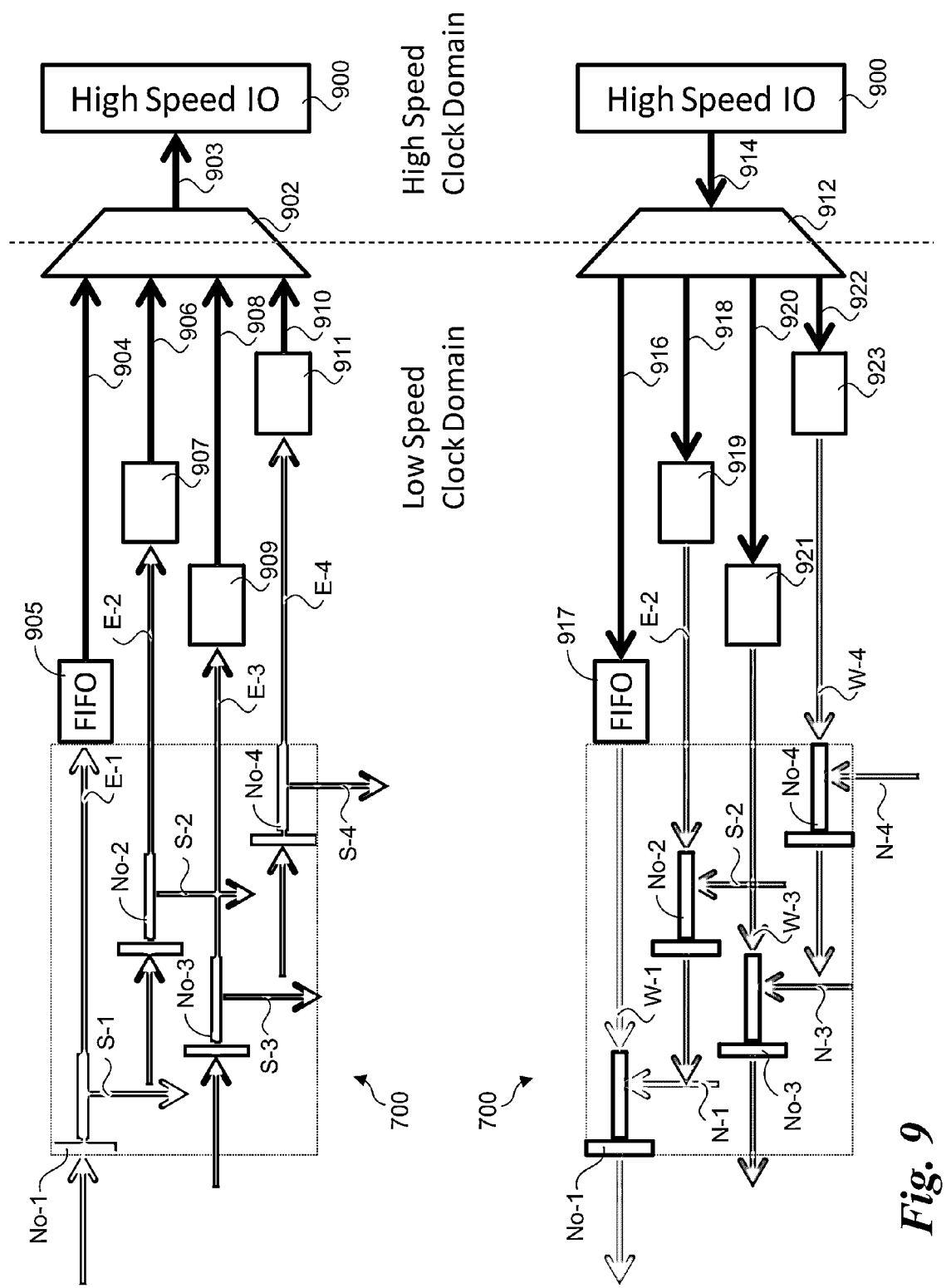
FIG. 9 is a schematic diagram showing a multiplexed/ demultiplexed interface between an IO and four 2D router meshes, according to one embodiment.

To facilitate use of standard tiles (and/or to otherwise support use of multiple mesh instances), the standard tiles on the periphery of the mesh need to be connected to the IO interfaces on the edges of the router. In one embodiment, this is facilitated through use of a muxing/demuxing scheme. For example, FIG. 9 illustrates an embodiment for selectively coupling data paths in standard tile 700 to a high speed IO interface 900. The upper half of the drawing shows egress data paths in the East direction that are leaving the overlaid 2D meshes being selectively coupled to an output port of high speed IO 900. As illustrated, the router mesh is operating at a clock domain that has a lower speed than the clock domain used by high speed IO 900. Data paths E-1, E-2, E-3, and E-4 are multiplexed to the output port of high speed IO 900 using a 4:1 mux 902 having an output 903. Each of data paths paths E-1, E-2, E-3, and E-4 is operatively coupled to a respective input 904, 906, 908, and 910 of mux 902 via a respective FIFO buffer 905, 907, 909, and 911. In one embodiment, these buffers comprise Bubble Generating FIFOs (BGFs) that are configured to perform frequency translation between the two clock domains. The buffers, in combination with other logic (not shown), may also be used to handle reordering operations, and facilitate flow control.

As shown in the lower half of FIG. 9, ingress into the router meshes at an input of high speed IO interface 900 is handled in a similar manner, albeit opposite in direction. In this case, a 1:4 demux 912 is used to selectively couple an input signal path 914 received from high speed IO interface 900 onto router mesh data paths W-1, W-2, W-3, and W-4 via demux outputs 916, 918, 920, and 922 and FIFOs 917, 919, 921, and 923. In one embodiment, these FIFOs also comprise BGFs.

Figure 10:
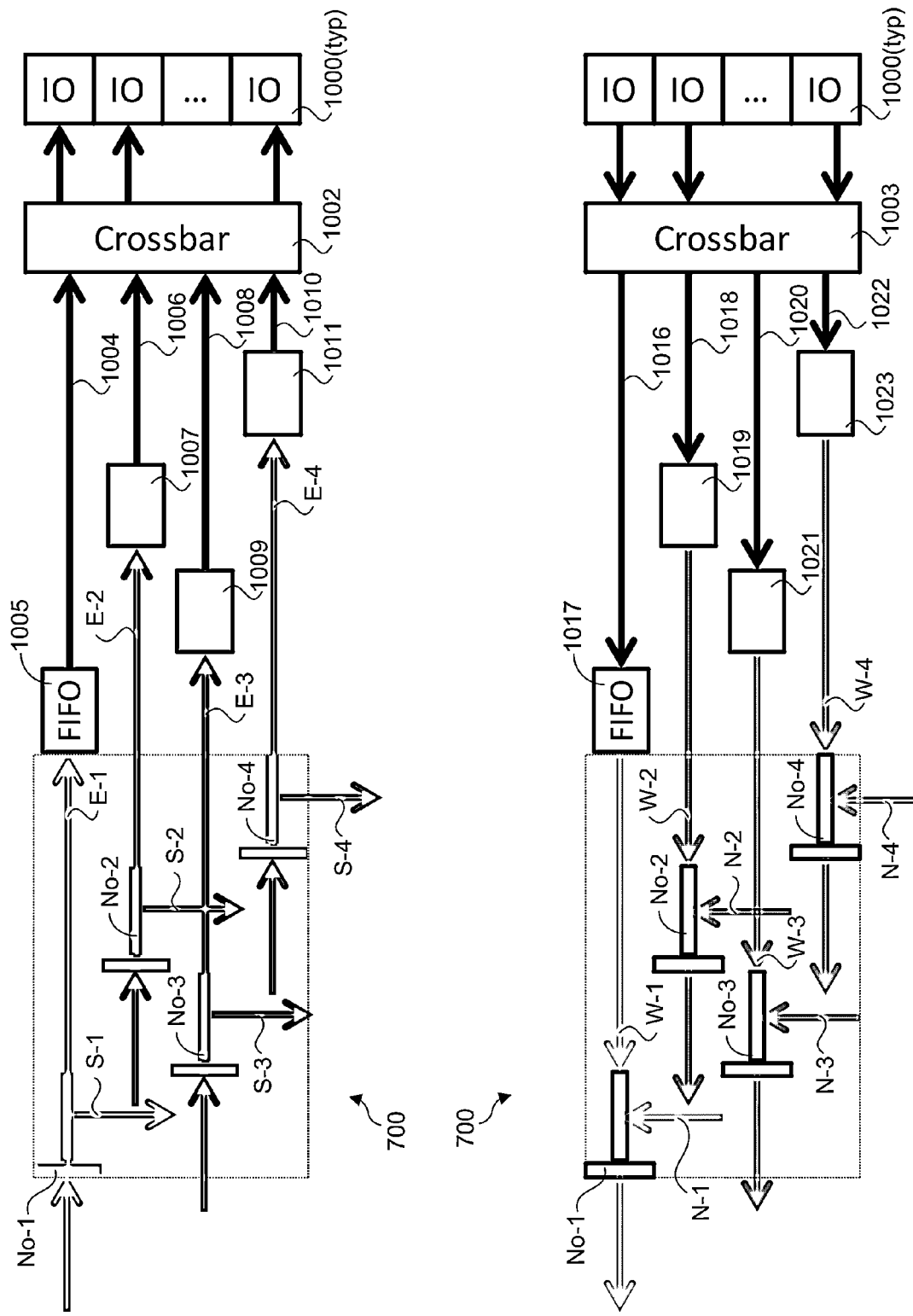
FIG. 10 is a schematic diagram illustrating crossbar interconnect interfaces between multiple IOs and the four 2D router meshes, according to an embodiment.

In addition to multiplexing signals to and from a single IO interface onto multiple router meshes, a given router mesh ingress or egress data path may be operatively coupled to multiple IO interfaces through use of a crossbar interconnect or similar circuitry. For example, the upper half of FIG. 10 shows egress signals from the East data paths E-1, E-2, E-3, and E-4 of standard tile 700 coupled to the output interfaces of a plurality of IO's 1000 via a crossbar interconnect 1002, while the lower half of FIG. 10 shows ingress signals received at West data paths W-1, W-2, W-3 and W-4 of standard tile 700 from the output interfaces of the plurality of IO's using a crossbar interconnect 1003. Each of data paths paths E-1, E-2, E-3, and E-4 is operatively coupled to a respective input 1004, 1006, 1008, and 1010 of crossbar interconnect 1002 via a respective FIFO buffer 1005, 1007, 1009, and 1011. Meanwhile, router mesh data paths W-1, W-2, W-3, and W-4 are operatively coupled to outputs 1016, 1018, 1020, and 1022 of crossbar interconnect 1003 via a respective FIFO buffer 917, 919, 921, and 923. As before, the FIFO buffers may comprise BGFs that are configured to support frequency translation, if applicable.

Figure 11:
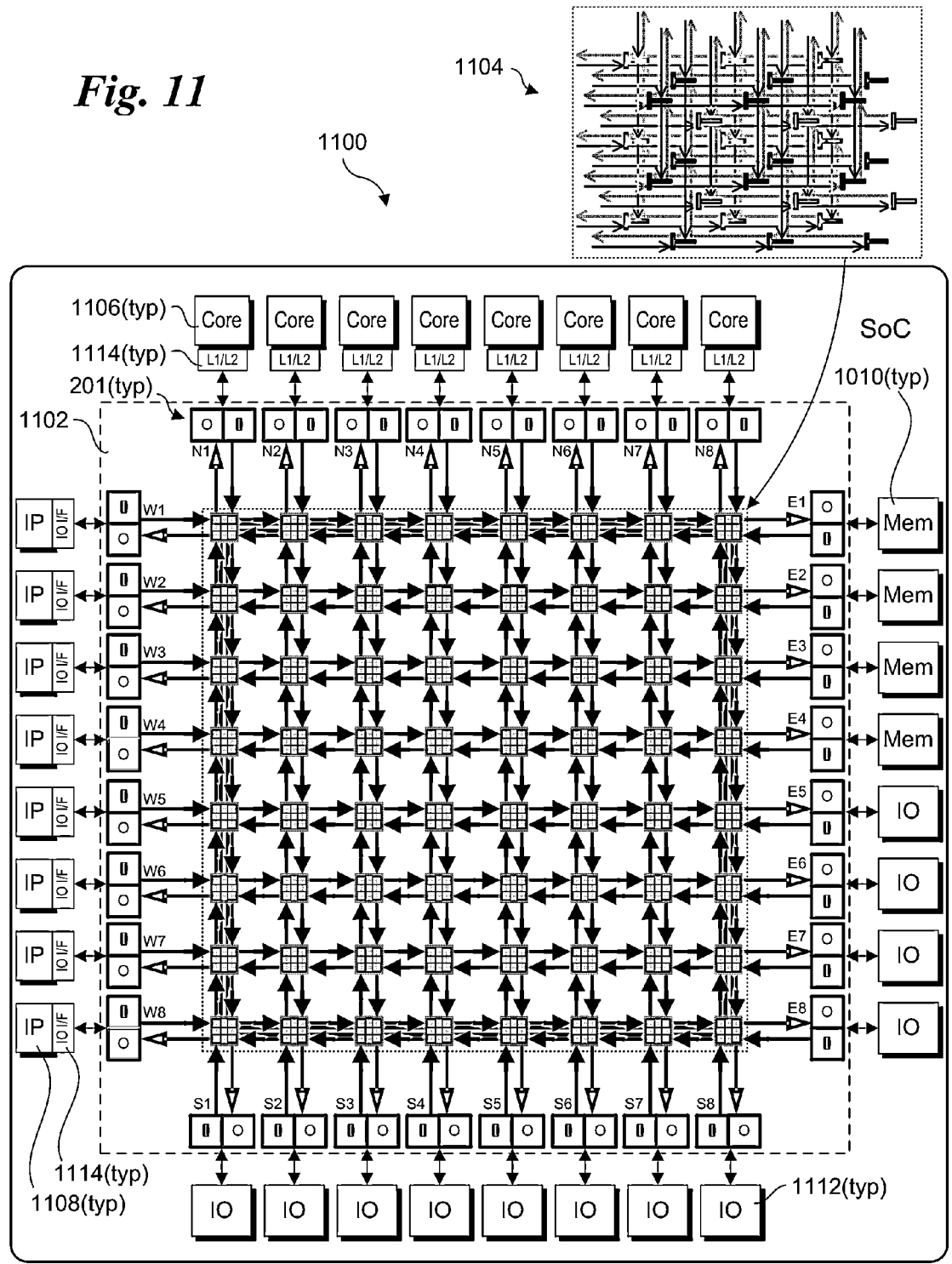
FIG. 11 is a schematic diagram of a System on a Chip including a 2D router mesh in accordance with aspects of the embodiments disclosed herein.

In addition to router chips and the like, aspects of the embodiments disclosed herein may be implemented in router meshes on a System on a Chip. FIG. 11 show an SoC 1100 including a multi-layer router mesh 1102. For simplicity and ease of understanding, only a single instance of a 2D mesh is depicted in FIG. 11; however, as shown by inset mesh detail 1104, in one embodiment SoC 1100 includes multiple 2D router meshes overlaid and offset relative to one another.

Generally, various types of logic blocks, components, and or devices that are configured to support IO operations may be connected to IO interfaces 201. For illustrative purposes and without limitation, these are depicted in SoC 1100 as including processor cores 1106, IP blocks 1108, memory controllers 1110, and IO devices 1112. Double-headed arrows are used for simplicity in FIG. 11 to illustrate connections between logic blocks, components, and devices and the IO interfaces; however it will be understood that there may be additional interconnect circuitry, logic, and interfaces used to couple these in communication that are not depicted. Accordingly, the logic blocks, components, and IO devices are termed herein as being operatively coupled to IO interfaces 201, meaning they may be directly coupled or coupled via addition circuitry that is operable (when the SoC is operating) to effect a connection between the components.

Each of cores 1106 includes a level 1 (L1) and level 2 (L2) cache block 1114 that is depicted as being connected to a respective IO interface 201 for illustrative purposes. In practice, cores 1106 may employ a caching agent or the like that may be connected to an IO interface, or may be connected to a last level cache (LLC) (not shown), which in turn is coupled to one or more IO interfaces 201. Many of the IO transactions originating from cores 1106 will comprise memory transactions used for writing to and reading from memory (e.g., system memory not shown) that is accessed via memory controllers 1110. In one embodiment, memory transactions originating from cores 1106 employ a coherent protocol, such as QPI or KTI.

Each of IP blocks 1108 is depicted as including an IO interface 1114 that is configured to facilitate communication with IO interfaces 201 using an applicable protocol. As with cores 1106, an IP block 1108 may be directly or operatively coupled to an IO interfaces 201. Similarly, an IO device 1112 may be coupled directly to an IO interface 201, or may be operatively coupled. For example, an IO device may be operatively coupled to an IO interface 201 via one or more interconnect layers in an IO interconnect hierarchy, such as a PCIe™ interconnect hierarchy.

The scalable multi-level 2D mesh router embodiments described herein provide significant enhancements of existing architectures and topologies. By having all of the IO interfaces external to the meshes, wiring layout utilization is improved while simultaneous enhancing energy efficiency. The architecture is also scalable, both in terms of the number of IOs that can be handled, as well as scaling router bandwidth through use of multiple overlaid and offset meshes. The use of standard tiles also is advantageous, as it enables tooling for very large router meshes to be more easily fabricated.

In addition to the structural configurations illustrated in the Figures herein (e.g., router chips and SoCs), embodiments of the present description may be also be implemented within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" or "operatively coupled" may mean that two or more elements are in direct physical or electrical contact. However, "operatively coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A router chip comprising:
   a plurality of input-output (IO) interfaces, disposed proximate to a periphery of the router chip; each IO interface comprising an IO input and an IO output;
   a first plurality of interconnect paths, configured in a first two-dimensional (2D) mesh comprising a plurality of rows and columns, each interconnect path operatively coupled at opposing ends to an IO input and an IO output for a pair of IO interfaces disposed on opposite sides of the router chip, wherein a given row or column of the 2D mesh includes a pair of interconnect paths configured to transfer data in opposite directions;
   a first plurality of router nodes, each disposed at a respective row and column intersection, wherein each router node is configured to route data along a path either in the same direction via which the data arrived at the node or turn the data to be routed along a path in a direction perpendicular to the direction via which the data arrived at the node; and
   a plurality of additional interconnect paths operatively coupled between nodes along the periphery of the first 2D mesh.

2. The router chip of claim 1, wherein data is transferred in data units that are transferred between adjacent nodes during a transfer cycle comprising a unit interval, and each node that is internal to the 2D mesh receives a data unit from each of a North, East, South, and West direction during each unit interval.

3. The router chip of claim 2, wherein during operation of the router chip, a node is configured to,
   receive a data unit along a path in a first direction, the data flow belonging to a first data flow;
   inspect routing data in the data unit to determine which direction the data unit is to be forwarded out of the node; and
   if the data unit is to be turned to be forwarded along a second path in a direction perpendicular to the first direction, copy the data unit to a buffer associated with logic for adding the data unit to a second data flow associated with the second path.

4. The router chip of claim 3, wherein an interior node in the first 2D mesh comprises:
   a respective set of components associated with each of a North, East, South and East direction path, each set of components including,
      a 1:3 demultiplexer (demux) having an input associated with a first path direction and three outputs, including a first output for forwarding a data unit along the first path direction, a second output for turning the data unit to be forwarded along a second path direction perpendicular to the first path direction, and a third output for turning the data unit along a third path direction perpendicular to the first path direction and opposite in direction to the second path direction;

a first turn buffer, operatively coupled to the second output of the demux;

a second turn buffer, operatively coupled to the third output of the demux; and a 3:1 multiplexer (mux), having an output associated with the first path direction, a first input operatively coupled to the first output of the 1:3 demux, and second and third inputs, each operatively coupled to a respective turn buffer coupled to an output of a respective 1:3 demux associated with a direction path that is perpendicular to the first direction path; and logic for controlling the 1:3 demux and the 3:1 mux.

5. The router chip of claim 1, further comprising logic that is configured to route data from the IO inputs to the IO outputs using a minimum distance routing path.

6. The router chip of claim 1, wherein the first 2D mesh is configured as an n×n or n×m mesh, and the number of addition interconnect paths is approximately n/12.

7. The router chip of claim 1, further comprising an agent operatively coupled to each IO interface, wherein the agent is configured to:

in response to an inbound data unit being received at an input of the IO interface to which the agent is operatively coupled, inspect a destination address for the data unit;

identify, in view of the destination address, an IO output via which the data unit is to be forwarded to from the IO input;

determine a routing path the data unit is to be routed to forward the data unit to the IO input that is identified;

create a wrapper having one or more fields containing data to effect forwarding of the data unit along the routing path;

encapsulate the data unit in the wrapper; and transmit the encapsulated data unit from the IO input to a first node along the routing path.

8. The router chip of claim 7, wherein the one or more fields comprises data identifying a destination IO, a first turn node identifier (ID) and a second turn node ID.

9. The router chip of claim 8, wherein each node includes logic configured to inspect data in the wrapper and determine what direction to forward the data unit based on the destination IO, the first turn node ID, and the second turn ID.

10. The router chip of claim 7, wherein the one or more fields comprises data identifying a source IO interface and a destination IO interface, and wherein each interior node is configured to route data units it receives based on the source IO interface and destination IO interface identified in the data unit.

11. The router chip of claim 7, wherein the agent is configured to generate and transmit null data units, and wherein upon receiving a null data unit a node is configured to replace the null data unit with a data unit that is buffered at the node.

12. The router chip of claim 1, wherein the first plurality of interconnect paths and the first plurality of router nodes comprises a first router mesh having a layout disposed at a first layer, wherein the router chip further comprises a plurality of router meshes including the first mesh, each router mesh having a similar layout that is overlaid and offset relative to the other router meshes, and wherein each of the plurality of router meshes have a plurality of egress path segments, each operatively coupled to at least one IO input interface and a plurality of ingress path segments, each operatively coupled to at least one IO output interface.

13. The router chip of claim 12, wherein an interior portion of the plurality of router meshes comprises a standard tile that is tessellated in X and Y directions to form a plurality of n×n meshes overlaid over one another.

14. The router chip of claim 12, wherein a plurality of egress path segments corresponding to different router meshes are operatively coupled to an IO output of an IO interface via a multiplexer, and an IO input of the IO interface is coupled to a plurality of ingress path segments corresponding to the different router meshes via a demultiplexer.

15. The router chip of claim 14, further comprises a buffer operatively coupled between each egress path segment and a respective input to the multiplexer, and a buffer operatively coupled between each ingress path segment and a respective output of the demultiplexer.

16. The router chip of claim 15, wherein the IO interface operates in a first clock domain having a first frequency and the router meshes operate in a second clock domain having a second frequency, and further wherein the buffers are configured to effect a frequency translation between the first and second clock domains.

17. The router chip of claim 12, wherein a plurality of egress path segments corresponding to different router meshes are operatively coupled to IO output of a plurality of IO interfaces via a first crossbar interconnect, and IO inputs of the plurality of IO interfaces are operatively coupled to a plurality of ingress path segments corresponding to the different router meshes via a second crossbar interconnect.

18. A System on a Chip (SoC) comprising:

a two-dimensional (2D) router mesh, including, a plurality of input-output (IO) interfaces, disposed proximate to a North, East, South and East edge of the router mesh; each IO interface comprising an IO input and an IO output;

a plurality of interconnect paths, configured in a 2D mesh comprising a plurality of rows and columns, each interconnect path operatively coupled at opposing ends to an IO input and an IO output disposed on opposite sides of the router mesh, wherein a given row or column of the 2D mesh includes a pair of interconnect paths configured to transfer data in opposite directions between pairs of IO interfaces; and a plurality of router nodes, each disposed at a respective row and column intersection, wherein each router node is configured to route data along a path either in the same direction via which the data arrived at the node or turn the data to be routed along a path in a direction perpendicular to the direction via which the data arrived at the node;

a plurality of processor cores, operatively coupled to at least one IO interface of the 2D router mesh;

a plurality of Intellectual Property (IP) blocks, each having an IO interface operatively coupled to at least one IO interface of the 2D router mesh; and a plurality of IO devices, each operatively coupled to at least one IO interface of the 2D router mesh, wherein data is transferred in data units that are forwarded between adjacent nodes during a transfer cycle comprising a unit interval, and each node that is internal to the 2D mesh receives a data unit from each of a North, East, South, and West directed data path during each unit interval.

19. The SoC of claim 18, wherein during operation of the SoC, a node is configured to,
- receive a data unit along a path in a first direction, the data flow belonging to a first data flow;
- inspect routing data in the data unit to determine which direction the data unit is to be forwarded out of the node; and
- if the data unit is to be turned to be forwarded along a second path in a direction perpendicular to the first direction, copy the data unit to a buffer associated with logic for adding the data unit to a second data flow associated with the second path.

20. The SoC of claim 19, wherein an interior node in the 2D router mesh comprises:
- a respective set of components associated with each of a North, East, South and East direction path, each set of components including,
  - a 1:3 demultiplexer (demux) having an input associated with a first path direction and three outputs, including a first output for forwarding a data unit along the first path direction, a second output for turning the data unit to be forwarded along a second path direction perpendicular to the first path direction, and a third output for turning the data unit along a third path direction perpendicular to the first path direction and opposite in direction to the second path direction;
  - a first turn buffer, operatively coupled to the second output of the demux;
  - a second turn buffer, operatively coupled to the third output of the demux; and
  - a 3:1 multiplexer (mux), having an output associated with the first path direction, a first input operatively coupled to the first output of the 1:3 demux, and second and third inputs, each operatively coupled to a respective turn buffer coupled to an output of a respective 1:3 demux associated with a direction path that is perpendicular to the first direction path; and
- logic for controlling the 1:3 demux and the 3:1 mux.

21. The SoC of claim 18, wherein the 2D router mesh comprises a plurality of 2D meshes, each comprising a plurality of interconnect paths configured in a plurality of rows and columns and a plurality of router nodes at the intersections of the rows and columns, each 2D router mesh having a similar layout that is overlaid and offset relative to the other router meshes, and wherein each of the plurality of 2D router meshes have a plurality of egress path segments, each operatively coupled to at least one IO input and a plurality of ingress path segments, each operatively coupled to at least one IO output.

22. The SoC of claim 21, wherein an interior portion of the plurality of 2D router meshes comprises a standard tile that is tessellated in X and Y directions to form a plurality of n×n meshes overlaid over one another.

23. The SoC of claim 21, wherein a plurality of egress path segments corresponding to different router meshes are operatively coupled to an IO output of an IO interface via a multiplexer, and an IO input of the IO interface is coupled to a plurality of ingress path segments corresponding to the different router meshes via a demultiplexer.

24. The SoC of claim 21, wherein a plurality of egress path segments corresponding to different 2D router meshes are operatively coupled to IO outputs of a plurality of IO interfaces via a first crossbar interconnect, and IO inputs of the plurality of IO interfaces are operatively coupled to a plurality of ingress path segments corresponding to the different 2D router meshes via a second crossbar interconnect.

25. A router chip, comprising:
- a plurality of 2D router meshes, each having wiring and circuitry laid out in a respective layer including,
  - a plurality of input-output (IO) interfaces, disposed proximate to a North, East, South and East edge of the 2D mesh; each IO interface comprising an IO input and an IO output;
  - a plurality of interconnect paths, configured in a 2D mesh comprising a plurality of rows and columns, each interconnect path operatively coupled at opposing ends to an IO input and an IO output disposed on opposite sides of the router mesh, wherein a given row or column of the 2D mesh includes a pair of interconnect paths configured to transfer data in opposite directions between pairs of IO interfaces; and
  - a plurality of router nodes, each disposed at a respective row and column intersection, wherein each router node is configured to route data along a path either in the same direction via which the data arrived at the node or turn the data to be routed along a path in a direction perpendicular to the direction via which the data arrived at the node,
- wherein the plurality of 2D router meshes have a similar layout that is offset relative to one another.

26. The router chip of claim 25, wherein an interior portion of the plurality of 2D router meshes comprises a standard tile that is tessellated in X and Y directions to form a plurality of n×n meshes overlaid over one another.

27. The router chip of claim 25, further comprising a plurality of additional interconnect paths operatively coupled between nodes along the periphery of at least one 2D router mesh.

28. The router chip of claim 25, wherein a plurality of egress path segments corresponding to different 2D router meshes are operatively coupled to an IO output of an IO interface via a multiplexer, and an IO input of the IO interface is coupled to a plurality of ingress path segments corresponding to the different 2D router meshes via a demultiplexer.

29. The router chip of claim 25, wherein a plurality of egress path segments corresponding to different 2D router meshes are operatively coupled to IO outputs of a plurality of IO interfaces via a first crossbar interconnect, and IO inputs of the plurality of IO interfaces are operatively coupled to a plurality of ingress path segments corresponding to the different 2D router meshes via a second crossbar interconnect.

30. The router chip of claim 25, further comprising agents associated with each of the IO inputs, wherein an agent is configured to:
- in response to an inbound data unit being received at an IO input to which the agent is associated,
- inspect a destination address for the data unit;
- identify, in view of the destination address, an IO output via which the data unit is to be forwarded to from the IO input;
- determine a routing path the data unit is to be routed to forward the data unit to the IO input that is identified;
- create a wrapper having one or more fields containing data to effect forwarding of the data unit along the routing path;
- encapsulate the data unit in the wrapper; and
- transmit the encapsulated data unit from the IO input to a first node along the routing path.

* * * * *